United States Patent [19]

Weber

[11] Patent Number: 5,297,495
[45] Date of Patent: Mar. 29, 1994

[54] PROCESS OF INCINERATING WASTE MATERIALS

[75] Inventor: Ekkehard Weber, Essen, Fed. Rep. of Germany

[73] Assignee: Metallgesellschaft AG, Frankfurt am Main, Fed. Rep. of Germany

[21] Appl. No.: 904,340

[22] Filed: Jun. 25, 1992

[30] Foreign Application Priority Data

Jun. 28, 1991 [DE] Fed. Rep. of Germany ....... 4121347

[51] Int. Cl.$^5$ .............................................. F23G 5/00
[52] U.S. Cl. .............................. 110/346; 110/165 R; 110/165 A; 110/204; 110/216; 110/345
[58] Field of Search .............. 110/165 R, 165 A, 203, 110/204, 345, 216, 346; 422/168

[56] References Cited

U.S. PATENT DOCUMENTS

| | | | |
|---|---|---|---|
| 4,915,039 | 4/1990 | Ringel | 110/346 |
| 4,977,837 | 12/1990 | Roos et al. | 110/165 A |
| 5,078,065 | 1/1992 | Tsunemi et al. | 110/165 A X |

FOREIGN PATENT DOCUMENTS 3907457 9/1990 Fed. Rep. of Germany .

Primary Examiner—Edward G. Favors
Attorney, Agent, or Firm—Michael J. Striker

[57] ABSTRACT

For the incineration of waste materials, a process is described, in which the waste materials are reduced in size as far as necessary and are subsequently optionally mixed with fuel and are incinerated at temperatures from 1000° to 1700° C. to form liquid ash, a major part of which is removed as liquid slag from the combustion chamber, and the pollutants are removed from the exhaust gases produced by the incineration. The process is characterized in that the pollutant-containing droplets of liquid ash which are suspended in the exhaust gas are separated at a temperature, which is close to the incineration temperature by at least one mass force separator and are subsequently either solidified alone or are combined with the liquid slag and solidified together with said slag.

12 Claims, 1 Drawing Sheet

PROCESS OF INCINERATING WASTE MATERIALS

BACKGROUND OF THE INVENTION

This invention relates to a process of incinerating waste materials, in which the waste materials are reduced in size as far as necessary and are subsequently optionally mixed with fuel and are incinerated at temperatures from 1000° to 1700° C. to form liquid ash, a major part of which is removed as liquid slag from the combustion chamber and the pollutants are removed from the exhaust gases produced by the incineration.

Waste materials—i.e., household and industrial wastes, hazardous wastes, agricultural waste products and clarifier sludge—have been incinerated on a large scale for many years in order to destroy pollutants contained in the waste material and to considerably decrease the amount of waste material which is to be dumped. In the past, the incineration of waste material has often given rise to problems because the exhaust gases as well as the ashes and fly dusts which are formed contain toxic substances, which pollute the environment and must be removed from the exhaust gases, ashes and fly dusts by expensive processes. As an example, attention may be directed here to the dioxins, which are formed by the incineration of waste materials and the formation of which must substantially be suppressed by an appropriate processing or which must be removed from purifying processes from the products of the incineration of waste materials. Specifically, the fly dusts, which are formed by the incineration of waste materials and consist of very fine ash particles, constitute a considerable hazard in the environment because they contain highly toxic organic compounds—i.e. dioxins, halogenated furans and highly condensed aromatic hydrocarbons—as well as heavy metals and heavy metal compounds and the latter will be dissolved at least in part in contact with water and in that case will contaminate the surface water and ground water. Because the plants for the incineration of waste materials contain considerable amounts of pollutants, they must be handled as hazardous wastes.

Numerous attempts have been made to eliminate the potential hazards which are due to the solid residues formed by the incineration of waste materials and are particularly due to the fly dusts. But it has been found again and again that the previously employed processes of incinerating waste materials result in solid residues which necessarily contain pollutants in considerable amounts. For instance, Published European Patent Application 305,779 discloses for the disposal of waste materials by incineration a process in which the dried waste materials are incinerated in a cyclone at temperatures above 1500° C. to form a molten slag having a low pollutant content and a hot exhaust gas. The liquid slag flows form a furnace which succeeds the incinerating cyclone. The exhaust gas is subjected to a first exhaust gas cooling and the valuable materials are then removed by a partial condensation, whereafter the exhaust gas is cooled further and the pollutants are subsequently removed by a partial condensation at a lower temperature. Because droplets of liquid ash are suspended in the exhaust gas, the partial condensation results in a formation of fly dust, which contains pollutants, or the partial condensation involves in a collection of valuable materials, which undesirably cannot be utilized because they have a high content of fly dust so that they must also be handled as pollutant-containing solid residues.

SUMMARY OF THE INVENTION

For this reason it is an object of the invention to provide for the incineration of waste materials a process in which the gaseous reaction products formed are free of pollutants and in which the solid residues formed are so immobilized that any pollutants contained therein will not be hazardous to the environment; i.e., the pollutants are required to be substantially inert with respect to air, water and soil.

The object underlying the invention is characterized in that the pollutant-containing droplets of liquid ash which are suspended in the exhaust gas are separated at a temperature, which is close to the incineration temperature by at least one mass force separator and are subsequently either solidified alone or are combined with the liquid slag and solidified together with the slag. This means that the process in accordance with the invention for the incineration of the waste material must be carried out in such a manner that the incineration residues which are solid at normal temperature will be in a liquid state during the incineration process and will also be collected in a liquid state. This remark is applicable to the ash flowing out of the combustion chamber and to the droplets of ash which are suspended in the exhaust gas. Whereas the separation of liquid ash from exhaust gases has already been proposed in Published German Patent Application 3,907,457, it is surprising that the solid residues which are formed by the incineration of waste materials will be particularly compatible with the environment if they are initially formed in a liquid state at a sufficiently high incineration temperature and are then separated in a liquid state from the combustion chamber and/or from the exhaust gas and only thereafter are transformed to a solid slag, which is in a vitreous state and in which the heavy metals and the heavy metal compounds are so bound that they will not be dissolved by water and will not react with the air or the soil. Besides, the slag does not contain toxic organic compounds, particularly no dioxins. It is particularly surprising that a solid, coarse-grained, vitreous slag rather than a toxic fly dust is formed in the process in accordance with the invention.

According to a preferred feature of the invention, coal, oil or gas is used as a fuel inasmuch as the heating value of the waste material is not sufficient for a production of liquid ash. The combustion of coal together with the waste materials will permit an influence to be exerted on the melting point of the ash, and the use of gas or oil will permit a generation of additional heat which may be required.

In accordance with the invention the mass force separators which are employed desirably comprise at least one inertial or baffle separator and/or at least one cyclone. A combination of different mass force separators or a series of separators of a similar type will be required if particularly low dust contents are specified for the pure gas. For instance, in the processing of an exhaust gas containing 6.5 grams of liquid ash per $sm^3$ ($sm^3$=standard cubic meter) a pure gas containing 30 mg liquid ash per $sm^3$ was obtained when one cyclone was employed whereas the content of liquid ash in the pure gas was decreased to 7 gm/$sm^3$ when two cyclones were connected in series.

According to a further feature of the invention the pollutants $SO_2$, $SO_3$, HF, HCl, NO, $NO_2$, any small amount of heavy metals and the heavy metal compounds are separated by dry, quasidry and/or wet processes of purifying exhaust gases from the exhaust gas after the droplets of liquid ash have been removed and the exhaust gas has been cooled.

The exhaust gas from which the liquid ash has substantially been removed is at a temperature from 900° to 1600° C. and may be subjected to a recovery of heat. When the exhaust gas has thus been cooled, the exhaust gas may be subjected to a dry or wet or quasidry process of purifying exhaust gas. To substantially remove the pollutants $SO_2$, $SO_3$, HF, HCl, NO, $NO_2$, any heavy metals, which will be present only in very low concentrations, and the heavy metal compounds, the exhaust gas may be scrubbed with various alkaline aqueous solutions. In a quasidry purification of the exhaust gas, aqueous substant suspensions of CaO and/or $Ca(OH)_2$ as well as activated carbon are introduced into the exhaust gas stream, the water is removed as by spray drying and a solid residue is formed, which contains the pollutants previously contained in the exhaust gas. In a dry purifying process, CaO, $Ca(OH)_2$ and activated carbon are preferably introduced into the exhaust gas stream so that the pollutants are chemically bound and adsorbed.

BRIEF DESCRIPTION OF THE DRAWING

The objects, features and advantages of the present invention will now be illustrated in more detail by the following detailed description, reference being made to the accompanying drawing in which:

The sole FIGURE is a flow chart showing an example of the method for incinerating waste material according to the invention.

DESCRIPTION OF A PREFERRED EMBODIMENT

Figure 1:
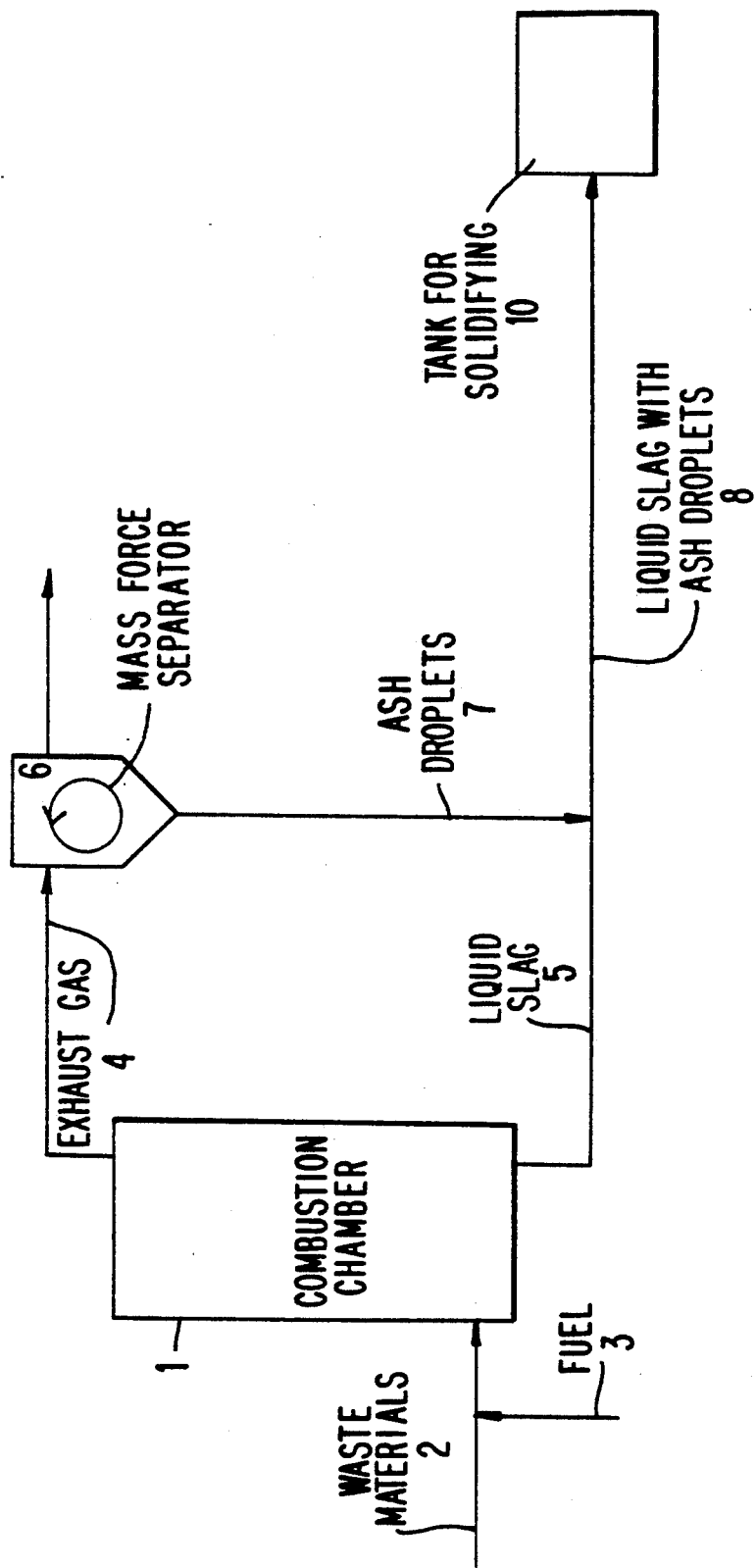

An example of the process according to the invention is shown in the figure. Waste material 2 and fuel 3 are fed to a combustion chamber 1 where the waste material 2 is to be incinerated. The fuel in this example is gas. The combustion chamber 1 is operated at an incineration temperature of 1000° to 1700° C. to form liquid ash and an exhaust gas 4 containing solid and gaseous pollutants as well as pollutant-containing liquid ash droplets. A major part of the liquid ash is removed from the waste materials as a liquid slag 5. The solid and gaseous pollutants are removed from the exhaust gas 4. The pollutant-containing liquid ash droplets 7 are separated from the exhaust gas 4 at a temperature in the vicinity of the incineration temperature by a cyclone separator 6. The pollutant-containing liquid ash droplets 7 separated previously are combined with the liquid slag 5 in a combined stream 8 which is solidified in the solidifying tank 10.

While the invention has been illustrated and described as embodied in a process for incinerating waste materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A process for incinerating waste materials comprising the steps of:
    a) incinerating waste materials at an incineration temperature of 1000° to 1700° C. to form a liquid ash and an exhaust gas containing solid and gaseous pollutants as well as pollutant-containing liquid ash droplets;
    b) removing a major part of the liquid ash from the waste materials as a liquid slag;
    c) removing the solid and gaseous pollutants from the exhaust gas;
    d) separating the pollutant-containing liquid ash droplets from the exhaust gas at a temperature in the vicinity of the incineration temperature by at least one mass force separator; and
    e) solidifying the pollutant-containing liquid ash droplets separated in step d).

2. A process as defined in claim 1, wherein the pollutant-containing liquid ash droplets solidified in the solidifying step e) are solidified together with the liquid slag obtained in step b).

3. A process as defined in claim 1, further comprising mixing the waste materials with a fuel prior to the incinerating step a).

4. A process as defined in claim 3, wherein the fuel is selected from the group consisting of coal, oil and gas.

5. A process as defined in claim 1, wherein the mass force separator is at least one inertial or baffle separator.

6. A process as defined in claim 1, wherein the mass force separator is at least one cyclone.

7. A process as defined in claim 1, wherein the mass force separator is at least one inertial or baffle separator and at least one cyclone.

8. A process as defined in claim 1, wherein the gaseous and solid pollutants in the exhaust gas include $SO_2$, $SO_3$, HF, HCl, NO, $NO_2$ and heavy metals and heavy metal compounds, and further comprising separating the gaseous and solid pollutants from the exhaust gas by wet methods after step d).

9. A process as defined in claim 1, wherein the gaseous and solid pollutants in the exhaust gas include $SO_2$, $SO_3$, HF, HCl, NO, $NO_2$ and heavy metals and heavy metal compounds, and further comprising separating the gaseous and solid pollutants from the exhaust gas by dry methods after step d).

10. A process as defined in claim 1, wherein the gaseous and solid pollutants in the exhaust gas include $SO_2$, $SO_3$, HF, HCl, NO, $NO_2$ and heavy metals and heavy metal compounds, and further comprising separating the gaseous and solid pollutants from the exhaust gas by quasidry methods after step d).

11. A process as defined in claim 1, wherein the gaseous and solid pollutants in the exhaust gas include $SO_2$, $SO_3$, HF, HCl, NO, $NO_2$ and heavy metals and heavy metal compounds, and further comprising separating the gaseous and solid pollutants from the exhaust gas by combination of dry and wet methods after step d).

12. A process as defined in claim 1, further comprising the step of reducing in size the waste materials prior to performing step a).

* * * * *